United States Patent

[11] 3,620,688

[72] Inventor Vytautas Grakauskas
 Arcadia, Calif.
[21] Appl. No. 812,432
[22] Filed Apr. 1, 1969
[45] Patented Nov. 16, 1971
[73] Assignee Aerojet-General Corporation
 El Monte, Calif.

[54] FLUOROAMMONIUM SALTS, THEIR PREPARATION, AND USES
 8 Claims, No Drawings

[52] U.S. Cl. .................................................. 23/356,
 23/357, 23/367, 260/239.3 A, 260/294.7 F,
 260/561 R, 260/583 NH, 260/579, 260/553 R,
 260/482 C, 23/50, 23/119, 23/190, 23/88, 23/85
[51] Int. Cl. ....................................................... C01c 1/00,
 C07c 87/06
[50] Field of Search........................................... 260/583,
 239.3 LP, 294.7 F, 561; 3/50, 85, 88, 119, 190,
 356, 357

[56] References Cited
UNITED STATES PATENTS
3,166,595 1/1965 Frazer ........................ 260/583
3,141,038 7/1964 Loux ........................... 260/583

OTHER REFERENCES
Grakauskas et al., " J. of Am. Chem. Soc." Vol. 90 No. 14 pgs. 3839–3841 (1968).
Sidgwick's " Organic Chemistry of Nitrogen" 3rd Edition (Oxford) (1966).

Primary Examiner—Henry R. Jiles
Assistant Examiner—Robert T. Bond
Attorneys—Edward O. Ansell, T. Reid Anderson and D. Gordon Angus ABSTRACT: This patent describes novel N-fluoroammonium salts having the general formula
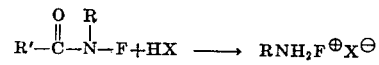
wherein R is selected from the group consisting of hydrogen, alkyl, substituted alkyl, cyclic or heterocyclic radicals; and X is selected from the group consisting of $ClO_4^{\ominus}$ and $HSO_4^{=}$. This patent further describes the preparation of the above-identified compounds in accordance with the following general reaction

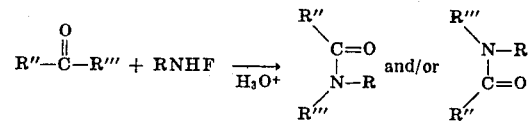

wherein R and X are as defined above, and R' is alkyl, alkoxy or amino. Still further, this invention comprises the hydrolysis of the above-identified N-fluoroammonium salts or the following salts of the formula
$RNH_2F\ SO_3^{\oplus}\ Y^{\ominus}$
wherein R is a previously defined and Y is a lower alkyl, typically having up to six carbon atoms, e.g. methyl or ethyl, to form N-fluoroamines in situ, and the reaction of the N-fluoroamines with ketones in accordance with the following general equation $$R''-\underset{\underset{}{\|}}{C}-R''' + RNHF \xrightarrow{H_3O^+} \underset{R'''}{\overset{R''}{\diagdown}}C=O \underset{R}{\underset{|}{N-R}} \text{ and/or } \underset{R''}{\overset{R'''}{\diagdown}}\underset{C=O}{\overset{N-R}{|}}$$

wherein R'' and R''' is selected from the group consisting of alkyl, aryl, cyclic and heterocyclic, and R is as defined above. Preferably, the N-fluoroammonium salts of this invention are prepared in the presence of an inert solvent.

FLUOROAMMONIUM SALTS, THEIR PREPARATION, AND USES

BACKGROUND OF THE INVENTION

The N-fluoroammonium salts have not been known prior to the present invention. The discovery of these compounds is believed to be a significant advance in the art since they are not only useful as oxidizing agents in solid rocket propellants but according to this invention they have been found to undergo hydrolysis to the formation of N-fluoroamines. The N-fluoroamines can be reacted with ketones which permits the preparation of amides from the corresponding ketones under very mild reaction conditions. This reaction has wide application in the preparation of certain commercially valuable amides such as ε-caprolactam and N-substituted ε-caprolactams.

SUMMARY OF THE INVENTION

Briefly, the present invention comprises novel N-fluoroammonium salts having the general formula $$RNH_2F^{\oplus}X^{\ominus}$$

Wherein R is selected from the group consisting of hydrogen, alkyl, substituted alkyl, cyclic or heterocyclic radicals; and X is selected from the group consisting of $ClO_4^{\prime\oplus}$ and $HSO_4^{\prime\oplus}$. This patent further describes the preparation of the above-identified compounds in accordance with the following general reaction equation

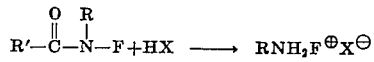

wherein R and X are as defined above, and R′ is alkyl, alkoxy or amino. Still further, this invention comprises the hydrolysis of the above-identified N-fluoroammonium salts or the following salts of the formula $$RNH_2F^{\oplus} \ SO_3Y^{\ominus}$$

Wherein R is as previously defined and Y is a lower alkyl containing up to six carbon atoms, e.g. methyl or ethyl, to form N-fluoroamines in situ, and the reaction of the N-fluoroamines so formed with ketones in accordance with the following general equation

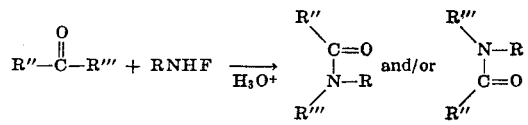

wherein R″ and R‴ is selected from the group consisting of alkyl, substituted alkyl, aryl, cyclic and heterocyclic and R is as defined above. Preferably, the N-fluoroammonium salts of this invention are prepared in the presence of an inert solvent.

In general, R, R″ and R‴ contain from one to about 10 carbon atoms, and may be groups such as methyl, ethyl, isopropyl, tertiary butyl, decyl, phenyl, naphthyl, tolyl, chloromethyl, nitroethyl, pyridinyl, cyclohexyl, and the like. It is also to be understood that R″ and R‴ may be joined to form a cyclic ketone such as a cyclohexanone or cyclopentanone. Aliphatic ketones particularly useful in this invention include acetone, methyl ethyl ketone and benzophenone.

It is an object of the present invention to provide a novel class of N-fluoroammonium salts.

Another object of the present invention is the provision of novel methods for the preparation of N-fluoroammonium salts in high yield and good purity.

Still another object of the present invention is the provision of novel N-fluoroamines.

Still another object of the present invention is the preparation of amides from ketones under very mild reaction conditions.

These and other objects and advantages of this invention will be apparent from the more detailed description which follows.

DESCRIPTION OF PREFERRED EMBODIMENTS

The salt-forming reaction of this invention is preferably carried out at a temperature of from about 0° to 100° C. The salts can be isolated in a variety of ways, including filtration and crystallization. Isolation is most easily accomplished when an inert halohydrocarbon solvent is used as the reaction media, as is more fully hereinafter described.

The fluorinated carbamate, urea or amide starting materials of the 3Y invention may be prepared by the direct fluorination of the corresponding carbamate as follows

This reaction may be carried out in aqueous or nonaqueous solution using from a one-to-one molar ratio of fluorine to carbamate. The reaction is preferably carried out at temperatures on the order of 0° C.

The preparation of the RNH₂F SO₃ salts is described in currently filed application Ser. No. 812,438 filed Apr. 1, 1969, the disclosure of which is expressly incorporated herein by reference.

The following examples are presented solely to illustrate the invention. As is shown in the examples, when solutions of N-fluoroammonium salts are diluted with water, hydrolysis occurs with the formation of the corresponding N-fluoroamines. The N-fluoroamines are unstable and cannot be isolated in pure form. The reactions with ketones described here are carried out with floroamines generated in situ. The reaction products between N-fluoroamines and ketones are the corresponding amides. When the ketone is symmetrical (R=R′), only one product is obtained. Similarly, only one amide is obtained from cyclic ketones. On the other hand when the ketone is asymmetric, two isomeric amides can result in these reactions.

EXAMPLE 1

Ethyl N-fluorocarbamate (6.42 g., 0.060 mole) was added dropwise to 20 ml. of concentrated sulfuric acid at room temperature, and the solution was heated at 85 to 90° C. until gas evolution ceased (20 min.). A sample of the evolved gas was collected in an infrared cell and was shown by its spectrum to consist of carbon dioxide and ethylene. The 56.4 mc. ¹⁹F nmr spectrum of the fluoroammonium bisulfate (NH₃F HSO₄ ) solution consisted of a quartet at +36.8 p.p.m., referred to external trifluoroacetic acid, with $J_{FH}$=38 c.p.s. No ethyl N-fluorocarbamate remained.

EXAMPLE 2

A fluoroammonium bisulfate solution was prepared from 6.42 g. (0.060 mole) of ethyl N-fluorocarbamate and 30 ml. of concentrated sulfuric acid as above. To this solution at 0° to 2° C., 4.9 g. (0.050 mole) of cyclohexanone was added dropwise with stirring over a 25 min. period. The resulting mixture was stirred at 5° to 10° C. for 30 min. and was then poured onto 70 g. of crushed ice. The mixture was neutralized with sodium hydroxide and extracted with five 50 ml. portions of ether. The ether solution was dried over sodium sulfate and the solvent was distilled off. The residue was recrystallized from pentane to give 3.5 g. (50 percent yield) of ε-caprolactam, m.p. 68° C. (not depressed in mixture melting point with an authentic sample).

EXAMPLE 3

To a solution of 94 g. (0.95 mole) of anhydrous perchloric acid in 900 ml. of chloroform (Baker's reagent grade, containing 0.6 percent methanol) was added dropwise at 24° to 28° C. a solution of 56.6 g. (0.468 mole) of isopropyl N-fluorocarbamate in 40 ml. of chloroform. The addition was conducted behind a safety barricade. The liberation of carbon dioxide (identified by IR) began immediately. The reaction mixture was heated at 42° to 43° C. until the gas evolution ceased (15 to 20 min.) and was then cooled to 25° C. The product was filtered under nitrogen, washed with five 100 ml. portions of chloroform, and dried at 0.2 mm. to give 67.4 g. (0.456 mole, 99.5 percent yield) of fluoroammonium perchlorate, m.p. 104° to 105° C. dec. Anal. Calc'd for NH₃ClFO₄: C, 0.0; H, 2.2; N, 10.4; F, 14.1. Found: C, 0.1; H, 2.3; N, 10.3; F, 14.0.

EXAMPLE 4

Isopropyl N-fluorocarbamate (2 g.) was added dropwise with stirring at 25° to 30° C. to 2.8 g. of 70 percent perchloric acid and the solution was heated for 1 hour at 35° to 40° C. The solution was concentrated to half of its original volume at 40° to 43° C. (0.05 mm.) and cooled to 20° C. The produce which precipitated was filtered under nitrogen and dried under vacuum to give 0.5 g. of impure fluoroammonium perchlorate. Anal. Found: C, 0.7; H, 2.6; F, 13.1.

EXAMPLE 5

A solution of 6.0 g. (0.050 mole) of ethyl N-fluoro-N-methylcarbamae in 20 ml. of concentrated sulfuric acid was heated at 85° to 95° C. until gas evolution ceased (20 min.). The $^{19}$F nmr spectrum of the methyl fluoroammonium bisulfate consisted of an incompletely resolved triplet of quartets at −29.5 p.p.m. (external trifluoroacetic acid reference), $J_{NH}$ −F=42 c.p.s. and $J_{CH}$ −F=28 c.p.s.

EXAMPLE 6

A methylfluoroammonium bisulfate solution prepared from 6.1 g. (0.05 mole) of ethyl N-fluoro-N-methylcarbamate and 30 ml. of sulfuric acid was cooled to 0° C. and added to a mixture of 150 g. of crushed ice and 4.4 g. (0.045 mole) of cyclohexanone. The resulting solution was allowed to stand at room temperature for 4 hrs., and then was extracted with four 25 ml. portions of methylene chloride. The combined methylene chloride solutions were dried with Drierite and distilled to give 2.5 g. (44 percent yield) of N-methylcaprolactam, b.p. 50° C. (0.3 mm.), $n^{25}$D 1.4814.

EXAMPLE 7

Fluorourea, 7.8 g. (0.1 mole) was dissolved in 100 ml. of concentrated sulfuric acid and the resulting solution was heated at 45° to 55° C. until gas evolution ceased (30 min.). The 56.4 mc. $^{19}$F nmr spectrum of the fluoroammonium bisulfate consisted of a quartet of +36.8 p.p.m., referred to external trifluoroacetic acid, with $J_{HF}$=38 c.p.s.

EXAMPLE 8

A solution of 6.0 g. (0.05 mole) of methyl N-ethyl-N-fluorocarbamate in 20 ml. of concentrated sulfuric acid was heated at 80° C. until gas evolution ceased (35 min.). The $^{19}$F nmr spectrum of the ethylfluoroammonium bisulfate consisted of a triplet of triplets at $\Phi$=15.5 p.p.m. exhibited by $CH_3CH_2NHB2F$

EXAMPLE 9

Following the conditions described in example 6, ethylfluoroammonium bisulfate solution (above) was reacted with cyclohexanone to give N-ethylcaprolactam in 73 percent yield.

EXAMPLE 10

N-ethyl-N-fluoroformamide, $HCONFC_2H_5$, 4.0 g. was added at 20° to 25° C. with stirring to 20 ml. of concentrated sulfuric acid and the resulting solution was heated at 65° to 70° C. for 40 min. The $^{19}$F nmr spectrum of the ethylfluoroammonium bisulfate was identical with that described in example 8.

EXAMPLE 11

Ethylfluoroammonium bisulfate solution prepared in example 10 was reacted with cyclohexanone following the conditions described in example 6 to give N-ethylcaprolactam in 68 percent yield.

EXAMPLE 12

Sulfuric acid solution of methylfluoroammonium bisulfate was obtained by hydrolyzing N-fluoro-N-methylformamide, $HCONFCH_3$, with concentrated sulfuric acid following the procedure in example 10.

EXAMPLE 13

Methylfluoroammonium bisulfate solution prepared in example 12 was reacted with aqueous cyclopentanone following the conditions described in example 6 to give N-methyl-2-piperidone in 62 percent yield.

EXAMPLE 14

Fluoroammonium bisulfate solution prepared from 0.1 mole of ethyl N-fluorocarbamate following the procedure described in example 1 was reacted with 0.1 mole of 3-pentanone in aqueous solution to give N-ethylpropionamide in 71 percent yield.

EXAMPLE 15

Fluoroammonium bisulfate solution prepared from 0.05 mole of ethyl N-fluorocarbamate following the procedure described in example 1 was reacted with 0.05 mole of aqueous 2-butanone to give N-ethylacetamide in 56 percent yield.

EXAMPLE 16

Fluoroammonium bisulfate solution prepared from 0.2 mole of ethyl N-fluorocarbamate following the procedure described in example 1 was reacted with 0.2 mole of aqueous cyclopentanone following the procedure described in example 6 to give 2-piperidone in 67 percent yield.

EXAMPLE 17

Methylfluoroammonium methanesulfonate solution in methanesulfonic acid prepared as described in the copending application referred to above was reacted with aqueous solution of 0.1 mole of cyclohexanone following the conditions described in example 6 to give N-methylcaprolactam in 63 percent yield.

EXAMPLE 18

Ethylfluoroammonium methanesulfonate solution prepared as described in the copending application referred to above as reacted with 0.1 mole of aqueous cyclopentanone to give N-ethyl-2-piperidone in 66 percent yield.

EXAMPLE 19

Fluoroammonium ethanesulfonate solution prepared as described in the copending application referred to above was reacted with 0.1 mole of aqueous cyclohexanone following the conditions described in example 2 to give ε-caprolactam in 72 percent yield.

EXAMPLE 20

Methylfluoroammonium ethanesulfonate solution prepared as described in the copending application referred to above was reacted with 0.1 mole of aqueous cyclohexanone following the conditions described in example 2 to give N-methylcaprolactam in 65 percent yield.

EXAMPLE 21

Ethylfluoroammonium methanesulfonate solution prepared as described in the copending application referred to above was reacted with 0.1 mole of aqueous cyclopentanone following the conditions described in example 7 to give N-ethyl-2-piperidone in 61 percent yield.

EXAMPLE 22

Fluoroammonium methanesulfonate solution was added to a solution of 0.1 mole of cyclopentanone in 300 ml. of ice water. The mixture was stirred vigorously for 30 min. and extracted with three 75 ml. portions of ether. The ether solution was dried over sodium sulfate and the solvent distilled off. The residue was crystallized from hexane to give 6.6 g. (65 percent yield) of 2-piperidone, m.p. 36° to 37° C., identified by its infrared spectrum.

EXAMPLE 23

A fluoroammonium methanesulfonate solution was prepared from 0.1 mole of isopropyl N-fluorocarbamate and 75 ml. of methanesulfonic acid at 55° C. To this solution at 0° to 2° C., 9.8 g. (0.1 mole) of cyclohexanone was added dropwise with stirring over a 15 min. period. The resulting solution was stirred at 5° C. for 15 min. and was then poured onto 200 g. of crushed ice. The mixture was extracted with four 70 ml. portions of ether. The ether solution was dried and the solvent was distilled off. The residue was recrystallized from hexane to give 7.1 g. (63 percent yield) of ε-caprolactam, m.p. 68° C.

The fluoroammonium perchlorate and bisulfate salts are preferably synthesized in an inert solvent such as chloroform or methylene chloride. In this way the salts in 98 to 100 percent purity can be obtained quantitatively. By way of contrast, when the salts are prepared from 70 to 72 percent aqueous perchloric acid, the yield of the salt is in the range of 30 to 50 percent and the salt must be subjected to very involved purification processes. The preparation of fluoroammonium perchlorate and bisulfate salts in methylene chloride or chloroform is carried out at 10° to 40° C. The addition time for the N-fluorocarbamate varies between 10 to 60 minutes. The reaction is practically instantaneous at 25° to 30° C. and fluoroammonium salt precipitates during the process in the form of a white, crystalline solid. The reaction is normally carried out in a conventional glass apparatus in an inert atmosphere. The reaction vessel, as well as all solvents and reagents, are dry. A slow stream of an inert gas, such as nitrogen or helium is passed through the reactor throughout the run. The rate of reaction as well as the completion is determined by the volume of carbon dioxide evolved during the process. The evolution of carbon dioxide can be followed conveniently by means of a wet-test meter connected in series with the reactor.

Fluoroammonium perchlorate is extremely sensitive to moisture, and its isolation, handling, and storage is carried out in a dry atmosphere, preferably in a dry box.

Example 3 above shows the use of chloroform as the inert reaction solvent. The following examples show other reactions using the preferred inert halohydrocarbon solvents of this invention.

EXAMPLE 24

To a solution of 6 9 g. (0.0687 mole) of anhydrous perchloric acid in 70 ml of methylene chloride was added, from a dropping funnel at 20° to 22° C. over a period of 40 minutes, a solution of 4 15 g (0.0343 mole) of isopropyl N-fluorocarbamate in 50 ml. of methylene chloride Slow gassing continued throughout and at the end of the carbamate addition The reaction mixture was allowed to stand at 25° C for 5 hrs., after which there was no noticeable evolution of gas The fluoroammonium perchlorate was collected by filtration (sintered glass funnel, dry nitrogen atmosphere, and the filter cake was washed with three 20 ml portions of methylene chloride The residual solvent was removed from the solid at a pressure of 0.2 mm. Hg, and the stoppered funnel containing the material was transferred into a dry box weight of fluoroammonium perchlorate 2.9 g. (63 percent yield) Anal Found C, 0 1, H, 2.5; N, 9.7; F, 14.0

EXAMPLE 25

To a solution of 8.0 g. (0.0762 mole) of anhydrous perchloric acid in 75 ml. of chloroform was added dropwise at 24° to 28° C., a solution of 4.6 g. (0.0381 mole) of isopropyl N-fluorocarbamate in 12 ml. of chloroform over a period of 20 minutes. At the end of the addition, the reaction mixture was warmed to 42° to 43° C. and kept there until the evolution of carbon dioxide ceased (15 to 20 min ) The reaction mixture was cooled to 20° to 25° C.; fluoroammonium perchlorate was collected by filtration and was washed with five 10 ml. portions of chloroform. The vacuum-dried, crystalline, low-bulk-density material amounted to 4.7 g. (91 percent yield). Anal. Found: C, 0.16; H, 2.4; N, 9.7; F, 14.3.

The foregoing preparation was scaled up to 94 g. (0.9353 mole) of anhydrous perchloric acid and 56.6 g. (0.4676 mole) of low-bulk-density crystalline fluoroammonium perchlorate. Anal. Found: C, 0.1; H, 2.4; N, 10.1; F, 13.6.

Yet another run in chloroform under identical conditions yielded 64 g. of fluoroammonium perchlorate. Anal. Found: C, 0.09; H, 2.1; F, 14.0.

EXAMPLE 26

The larger batches of fluoroammonium perchlorate were obtained with remotely operated apparatus. The apparatus now consists of a well-shielded, three-necked, round-bottomed, 2-liter, glass flask equipped with a magnetic stirrer, a thermometer, and gas inlet and outlet tubes. The flask is surrounded by a trichloroethylene bath, which is used initially for cooling and subsequently for warming of the reactor. The bath is placed on the top of a remotely controlled hotplate, magnetic stirrer apparatus. At the beginning of a run, the bath surrounding the reactor is kept at −80° C. and anhydrous perchloric acid is distilled at reduced pressure from the generator and condensed in the reactor. The gas inlet tube joint of the reactor at this stage of the operation is used to receive the end of a condenser from the perchloric acid generator. The gas outlet tube of the reactor is connected through a −80° C. safety trap to a vacuum pump. The perchloric acid generator, containing a mixture of 70 percent perchloric and 20 percent fuming sulfuric acid, is weighed before and after the distillation; in this manner the weight of anhydrous perchloric acid distilled into the reactor is obtained. The perchloric acid generator is now removed and replaced by an adapter that accommodates a dropping funnel containing chloroform (about 75 ml. per 10 g. of the acid). The reactor is warmed to −30° to −40° C. and chloroform is introduced from the dropping funnel through the condenser. The reactor is now warmed to 20° to 25° C., the gas outlet tube is connected to a wet-test meter, and isopropyl N-fluorocarbamate solution in chloroform (2 ml. of chloroform per gram of carbamate) is added to the stirred perchloric acid solution over a period of 20 to 40 minutes. After the carbamate addition, the reaction mixture is warmed to 40° to 45° C and the reaction is completed in 10 to 15 minutes The reaction mixture is cooled to 20° to 25° C., and the thermometer in the center neck of the flask is replaced (remotely) by a filter stick The solution is removed from the reactor by suction and replaced by fresh chloroform At this stage, the reactor containing fluoroammonium perchlorate suspension in chloroform is disconnected from the apparatus and the salt is collected by filtration in a sintered glass funnel The filtration assembly is enclosed in a polyurethane bag, and a fast stream of dry nitrogen is passed through it during this operation The filter cake is washed several times with chloroform, and the residual solvent is removed at 0.2 mm Hg The closed funnel is now transferred to a dry box for the sampling and packaging of fluoroammonium perchlorate Having fully described the invention it is intended that it be limited only by the lawful scope of the appended claims.

I claim

1 Novel N-fluoroammonium compounds having the general formula

RNH₂F X wherein R is selected from the group consisting of hydrogen, and lower alkyl, and X is selected from the group consisting of $ClO_4^-$ and $HSO_4^-$ 2 Fluoroammonium bisulfate 3 Fluoroammonium perchlorate.

4. Methylfluoroammonium bisulfate

5 Ethylfluoroammonium bisulfate

6. The method of preparing amides which comprises hydrolyzing a compound of the formula

RNH$_2$F X in the presence of a ketone selected from the group consisting of an aliphatic ketone, cyclopentanone and cyclohexanone, wherein in the above formula R is selected from the group consisting of hydrogen, and lower alkyl, and X is selected from the group consisting of C1O$_4'^{7E'}$, HSO$_4'^{7E'}$, or SO$_3$Y, wherein Y is a lower alkyl.

7. The method of preparing ε-caprolactam which comprises reacting fluoroammonium bisulfate with cyclohexanone in the presence of concentrated sulfuric acid.

8. The method of preparing N-methyl ε-caprolactam which comprises reacting methylfluoroammonium bisulfate with cyclohexanone in the presence of concentrated sulfuric acid.

* * * * *